United States Patent Office 3,153,041
Patented Oct. 13, 1964

3,153,041
PROCESS FOR PREPARATION OF GLUTARIMIDE DERIVATIVES
Francis Johnson, Newton Lower Falls, and Alexander C. Paton, Bedford, Mass., assignors to The Dow Chemical Company, Midland, Mich., a corporation of Delaware
No Drawing. Filed Nov. 1, 1961, Ser. No. 149,174
4 Claims. (Cl. 260—281)

The present invention is directed to a process for preparing dehydrocycloheximide type compounds.

An optical isomer of dehydrocycloheximide, which has been prepared by fermentation using a strain of streptomyces griseus followed by chemical oxidation, has useful fungicidal activities and is a rodent repellent. There has been no known synthesis for this chemical.

It is an object of this invention to provide a process for preparing dehydrocycloheximide compounds. It is also an object of this invention to provide novel dehydrocycloheximide-type compounds.

We have discovered that dehydrocycloheximide type compounds can be prepared from acylated enamines as illustrated in the following equation:

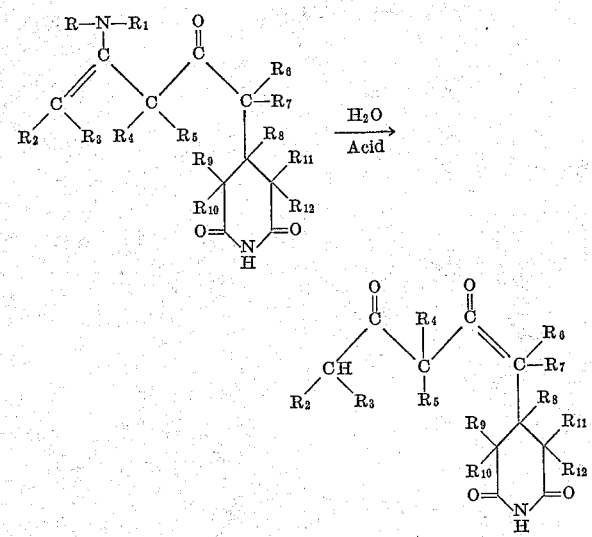

The $R_2$–$R_{12}$ groups may be hydrogen or any substituting group or radical, such as lower alkyl, aryl, alkoxyl, aryloxyl, dialkylamino, halogen, etc. These are exemplified by methyl, butyl, benzyl, octyl, phenyl, diethylamino, phenoxyl, methoxyl, etc. The $R_6$–$R_{12}$ groups are preferably hydrogen or lower alkyl. It is also preferred that not more than one hydrogen should be substituted for on a ring carbon. The $R_2$–$R_5$ groups may be cyclized or fused to form ring cyclic moieties. These cyclic moieties may, and usually do, contain substituting groups on the ring carbon atoms. The preferred $R_2$–$R_5$ containing moieties have the formula

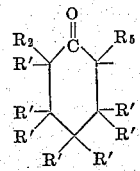

The preferred R′, $R_2$ and $R_5$ groups are hydrogen, lower alkyl and alkoxyl. It is also preferred that the ring carbon atoms should be bonded to at least one hydrogen atom. The useful substituting R groups are those that do not react with the reactants and reaction products under the process conditions. The R and $R_1$ groups may be lower alkyl; preferably, together with the nitrogen atom, they constitute amines such as morpholine, piperidine, pyrrolidine, etc.

The acylated enamines used as the reactant in the preparation of the dehydrocycloheximide type compounds are prepared by treating a glutarimide β-acetyl chloride with an enamine of a cyclic ketone from a secondary amine, in a solvent containing a tertiary ammonium base. The process for preparing the adducts is described in Francis Johnson's copending application filed of even date herewith entitled "Cyclic Compounds I" Serial No. 149,230. The disclosure of said application is by this reference incorporated herein.

The acylated enamines are transformed into the dehydrocycloheximide type compound in an aqueous acid solution. The pH should be between 3 and 7. Buffered systems are preferred. The reaction temperatures and pressure are not critical. The reaction is preferably carried out between about 0° C. and room temperature. A nitrogen atmosphere is preferred.

For purposes of further explaining the invention to those skilled in the art, the following illustrative examples are given. In each of the examples the preparation of the acylated enamine is also described.

Example I 3-carboxymethylglutarimide (5.0 g.) was gently refluxed with thionyl chloride (50 ml.) until complete solution of the solid had been effected. The excess thionyl chloride was removed under reduced pressure on the steam bath and the crystalline acid chloride remaining was freed of traces of thionyl chloride by drying under vacuum for 2 hours over anhydrous potassium carbonate. The acid chloride was then slurried in dry chloroform (100 ml.) under a nitrogen atmosphere. The temperature of the mixture was adjusted to 0° by means of an ice bath and a solution of the dry triethylamine (5.0 g.) in dry chloroform (25 ml.) added in 1 portion. The mixture was stirred for 15 minutes and then a solution of the morpholine enamine (17.1 g.) of cis-2,4-dimethylcyclohexanone in dry chloroform (25 ml.) was added in 1 portion. Stirring under nitrogen was continued for 16 hours, the mixture slowly coming to room temperature during the early part of this stirring period. At the end of this time a small amount of solid material remained undissolved. This was collected by filtration (118.0 mg.) and discarded. The filtrate was evaporated under reduced pressure to remove chloroform. The residual brown gum was then stirred with a mixture of sodium acetate (18 g.), water (60 ml.), methanol (45 ml.) and acetic acid (15 ml.) for 4 hours. The crystalline precipitate that had formed was collected, washed with methanol/water (1:1) sucked dry on the filter and crystallized from a mixture of methylene chloride and methanol to give white flaky plates of dl-dehydrocycloheximide, M.P. 173–5° (3.6 g.). A specimen of this material was recrystallized several times from ethanol to give lustrous plates of the pure dl-dehydrocycloheximide, M.P. 181–183°. (Found: C, 64.4%; H, 7.7%; N, 4.9%. Calculated for $C_{15}H_{21}O_4N$: C, 64.49%; H, 7.58%; N, 5.01%.)

Example II 3-carboxymethylglutarimide (3.44 g.) was finely powdered and added to thionyl chloride (35 ml.). The mixture was gently refluxed until homogeneous. Excess thionyl chloride was removed under reduced pressure and the crystalline pale-brown solid residue was stored over potassium hydroxide pellets for 3 hrs. in a vacuum desiccator. To the dry acid chloride there was added a solution of dry triethylamine (3.03 g.) in pure dry chloroform (50 ml.). The mixture was stirred for 5 minutes magnetically and there was then added in one portion the morpholine enamine of cyclohexanone (10.5 g.). After stirring for 1½ hours the mixture had become a completely homogeneous clear solution. Stirring was then continued overnight. The chloroform was removed under pressure and the brown slushy residue treated with a solution of sodium acetate (12 g.) and acetic acid (10 ml.) in methanol (30 ml.) and water (40 ml.). Shaking this mixture gave initially a clear homogeneous solution but a crystalline material quickly began to precipitate. After standing at 5° C. for 2 hours, solid bis-(normethyl) dehydrocycloheximide was removed by filtration, washed with water and air-dried (2.65 g.) M.P. 142-4°. The mother liquors yielded an additional 0.4 g. of this substance which was isolated via its copper chelate. Further crystallization of this material from methanol did not improve the melting point. (Found: C, 62.0%; H, 6.8%; N, 5.7%. Req'd for $C_{13}H_{17}O_4N$: C, 62.14%; H, 6.82%; N, 5.57%.) When the mixed anhydride of 3-carboxymethylglutarimide and ethyl hydrogen carbonate was used in place of the acid chloride of 3-carboxymethylglutarimide, the final product was obtained in smaller yield.

*Example III*

3-carboxymethylglutarimide (5.13 g.) was gently refluxed with thionyl chloride (60 ml.) until the solution became homogeneous. Excess thionyl chloride was then removed under reduced pressure and the highly crystalline pale-brown residue was stored over potassium hydroxide in a vacuum desiccator for 2 hours to remove remaining traces of thionyl chloride. The solid was then suspended in dry chloroform (75 ml.) and with stirring under nitrogen, triethylamine (4.5 g.) was added. After stirring for 5 minutes the morpholine enamine of 2-methylcyclohexanone (10.86 g.) was added over a period of 3 minutes. Stirring was then continued for 16 hours. The liquid was then filtered to remove a trace of insoluble material (0.3 g.) and the filtrate evaporated under reduced pressure at less than 40° to remove chloroform. The slushy residue was then treated at room temperature with a solution of sodium acetate (18 g.) in acetic acid (15 ml.), methanol (45 ml.) and water (60 ml.). Light petroleum (50 ml., B.P. 30-60°) was added and the solution was stirred overnight. The white precipitate which appeared during the stirring period was removed by filtration, washed with light petrolum then water and dried (2.4 g.) M.P. 122-4°. A sample of this material recrystallized 3 times from ether and methylene chloride had M.P. 130-132° was identified as dl-4-normethyldehydrocycloheximide. Further crystallization failed to improve the melting point. (Found: C, 63.3%; H, 7.2%; N, 5.4%. Req'd for $C_{14}H_{19}O_4N$: C, 63.38%; H, 7.22%; N, 5.28%.)

*Example IV*

Following the procedure of Example III, the morpholine enamine of 2,4-dibutylcyclohexanone is used in place of the morpholine enamine of 2-methylcyclohexanone to obtain the corresponding acylated enamine, which is then converted to the corresponding dehydrocycloheximide in the acid bath.

*Example V*

Following the procedure of Example III, the morpholine enamine of 4-ethoxycyclohexanone is used in place of the morpholine enamine of 2-methylcyclohexanone to obtain the corresponding acylated enamine, which is then converted to the corresponding dehydrocycloheximide in the acid bath.

*Example VI*

Following the procedure of Example III, the morpholine enamine of 2-ethylcyclohexanone is used in place of the morpholine enamine of 2-methylcyclohexanone to obtain the corresponding acylated enamine, which is then converted to the corresponding dehydrocycloheximide in the acid bath.

*Example VII*

Following the procedure of Example III, the morpholine enamine of 2,4-diethylcyclohexanone is used in place of the morpholine enamine of 2-methylcyclohexanone to obtain the corresponding acylated enamine, which is then converted to the corresponding dehydrocycloheximide in the acid bath.

*Example VIII*

Following the procedure of Example III, the morpholine enamine of 2-butylcyclohexanone is used in place of the morpholine enamine of 2-methylcyclohexanone to obtain the corresponding acylated enamine, which is then converted to the corresponding dehydrocycloheximide in the acid bath.

The preparation of dl-bis(normethyl) dehydrocycloheximide was also carried out using the piperidine and the pyrrolidine enamines of cyclohexanone in place of the morpholine enamine of Example II. In other respects the procedure of Example II was followed. The resultant products were the same. Similarly, various substituted dehydrocycloheximides, as well as isomers and homologues thereof, are prepared using reactants with desired R groups substituted on the noted carbon atoms.

Utilizing the present process it is possible to prepare racemic mixtures of dehydrocycloheximide and various isomers, homologues, and analogues thereof. By proper choice of the ketone and the glutarimide β-acetic acid, it is possible to obtain optically active compounds. The class of compounds have very interesting fungicidal activities. They are rodent repellents. Surprisingly, it has been found that the novel racemic mixture prepared as specified in Example I has the same fungicidal activity as the naturally occurring optically active isomer.

Although our invention has been illustrated by specific examples, it is to be understood that it includes all modifications and variations that come within the scope of the appended claims.

What is claimed is:

1. The process comprising reacting an acylated enamine in a non-protonic solvent and having the formula

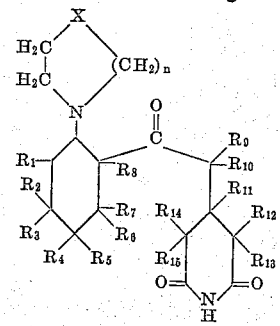

wherein the substituents $R_1$ to $R_{15}$ are selected from the group consisting of hydrogen, lower alkyl and lower alkoxy, $n$ is a digit from 1 to 2, and X is selected from the group consisting of oxygen and methylene; by adding an aqueous solution having a pH between 3 and 7, to form a precipitate and then recovering said precipitate.

2. The process of claim 1 wherein the reaction is carried out under an inert atmosphere at a temperature between 0° C. and room temperature.

3. The process of claim 2 wherein the aqueous solution is buffered.

4. The process of claim 3 wherein the aqueous solution contains acetic acid, sodium acetate and methanol.

References Cited in the file of this patent

Noller: Chemistry of Organic Compounds, 2d Ed., pp. 161-2 and 475 (1957).

Karrer: Organic Chemistry, 2nd Edition, pages 92-102 (1946).

Kornfeld et al.: J. Am. Chem. Soc., vol. 71, pages 150-9 (1949), pages 151, 156, 157 relied on.